United States Patent [19]

Rathert

[11] Patent Number: 4,467,912

[45] Date of Patent: Aug. 28, 1984

[54] BOOK BLOCK GRIPPER FOR A TRANSPORT SYSTEM

[75] Inventor: Horst Rathert, Minden, Fed. Rep. of Germany

[73] Assignee: Rahdener Maschinenfabrik August Kolbus, Rahden, Fed. Rep. of Germany

[21] Appl. No.: 350,252

[22] Filed: Feb. 19, 1982

[30] Foreign Application Priority Data

Feb. 27, 1981 [DE] Fed. Rep. of Germany ....... 3107458

[51] Int. Cl.[3] .............................................. B65G 47/86

[52] U.S. Cl. .................................... 198/650; 198/653; 198/695

[58] Field of Search ............... 198/479, 653, 650, 695; 271/268, 277, 82, 85; 294/86 R; 267/162

[56] References Cited

U.S. PATENT DOCUMENTS

| | | | |
|---|---|---|---|
| 3,394,631 | 7/1968 | Thompson | 267/162 X |
| 3,836,195 | 9/1974 | Teeri | 267/162 |
| 4,231,466 | 11/1980 | Rathert | 198/479 |

FOREIGN PATENT DOCUMENTS

| | | | |
|---|---|---|---|
| 5260 | 11/1979 | European Pat. Off. | 294/86 R |
| 2725416 | 12/1978 | Fed. Rep. of Germany . | |
| 285178 | 1/1972 | U.S.S.R. | 294/86 R |

*Primary Examiner*—Joseph E. Valenza
*Assistant Examiner*—Daniel R. Alexander

[57] ABSTRACT

Apparatus for supporting book blocks during the movement thereof comprises a pair of flat plate-like jaws, one of the jaws being relatively movable with respect to the other. A clamping force for the movable jaw is developed through the use of a spring element comprising a plurality of series connected cup-type springs.

2 Claims, 4 Drawing Figures

BOOK BLOCK GRIPPER FOR A TRANSPORT SYSTEM

BACKGROUND OF THE INVENTION (1) Field of the Invention

The present invention relates to the manufacture of books and particularly to the movement of book blocks between successive stations of a book binding apparatus. More specifically, this invention is directed to a book block transport system and especially to book block gripping mechanisms for use in such a transport system. Accordingly, the general objects of the present invention are to provide novel and improved methods and apparatus of such character.

(2) Description of the Prior Art

In the manufacturer of books it is common practice to transport the assemblied book blocks between work stations by means of a transport system which comprises a plurality of book block gripping mechanisms. These block gripping mechanisms are continuously moved along a closed orbital track. During transport the book blocks are held between a stationary jaw, which is a flat plate-like member, and a movable jaw. The jaws are mounted from a supporting frame which is coupled to a transport chain. The movable jaw of the book block gripping mechanism will be located at the end of a pivot arm, the axis about which this arm pivots being generally parallel to the stationary clamping jaw. The opening and closing of the movable jaw is controlled by a cam and cam follower arrangement with the motion of the cam follower being transmitted to the pivot arm via a force transmission lever. A spring element will be located between the force transmission lever and the pivot arm in order to transmit the clamping force. The spring element is employed to provide compensation for variations in block thickness.

German Pat. No. 2,725,416 discloses a book block transport system of the type generally described above wherein a torsion bar spring is employed as the spring element. This torsion bar spring transmits the clamping force from the cam follower to the movable jaw and provides compensation for varying block thicknesses without requiring adjustment of the transport system.

In the transport system of the referenced German patent, in order to have adequate clamping force when the block thickness is small, the torsion spring is preloaded in such a way that the supporting tubes which receive the ends of the spring are twisted through a defined angle with respect to each other. Nevertheless, the spring characteristic is linear, as is also the case when tension or compression springs are employed to develop the clamping force for the movable jaw, and thus the actual clamping force applied to the book block is proportional to block thickness. Accordingly, in the region of work stations, additional force must be applied to the movable jaw in order to insure that the book block is not moved out of position or actually torn from between the jaws.

Because of space and cost considerations, the above-discussed problem of a clamping force which decreases as book block thickness decrease can not be satisfactorily solved merely by resort to the use of larger springs.

SUMMARY OF THE INVENTION

The present invention overcomes the above-discussed and other deficiences of the prior art by providing a novel and improved book block gripper which is characterized by the application, to the movable jaw, of greater clamping forces than has characterized the prior art, particularly for book blocks of small thickness. Apparatus in accordance with the present invention is further characterized by a reduction in manufacturing cost when compared to the prior art.

In accordance with a preferred embodiment, the present invention employs a series connected cup-type, i.e., washer or Belleville, springs as the spring element disposed between the clamping-force transmission lever, operated by a cam and cam follower, and a pivot arm which carries the movable clamping jaw. The spring stack, which has a degressive characteristic curve, is preferrably mounted on the aforesaid force transmission lever and a tension rod, supported behind the stack of springs, is articulated to an extension of the pivot arm which carries the movable jaw.

Also in accordance with a preferred embodiment, the stack of cup springs is positioned within a tubular receptacle affixed to the cam-operated force transmission lever. The tension rod will extend through the spring stack. Means are provided which permit the preloading of the spring stack.

The employment of a stack of cup springs enables even thin book blocks to be clamped with the maximum clamping force since the characteristic curve of the cup springs is of the degressive type. Further, the fact that the characteristic curve of the spring element of the present invention may be varied over a wide range reduces the cost of manufacturing a block transport. The high spring forces available from the cup springs also permits maximizing the available clamping forces while minimizing space requirements. Since the limits of the clamping force available are determined solely by the structural strength of those elements which transmit the force, and because of the nature of the particular spring element employed in the present invention, it is not necessary to employ additional holding force to the book blocks during operations performed thereon while the blocks are held between the jaws of the transport mechanism.

A further feature of the preferred embodiment of the present invention resides in the fact that the force transmitting cup spring stack also functions as a damper to absorb shock produced during the opening of the book block gripping jaws. Accordingly, the need for separate shock absorbers is eliminated and the present invention thus offers a further cost advantage.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 2:
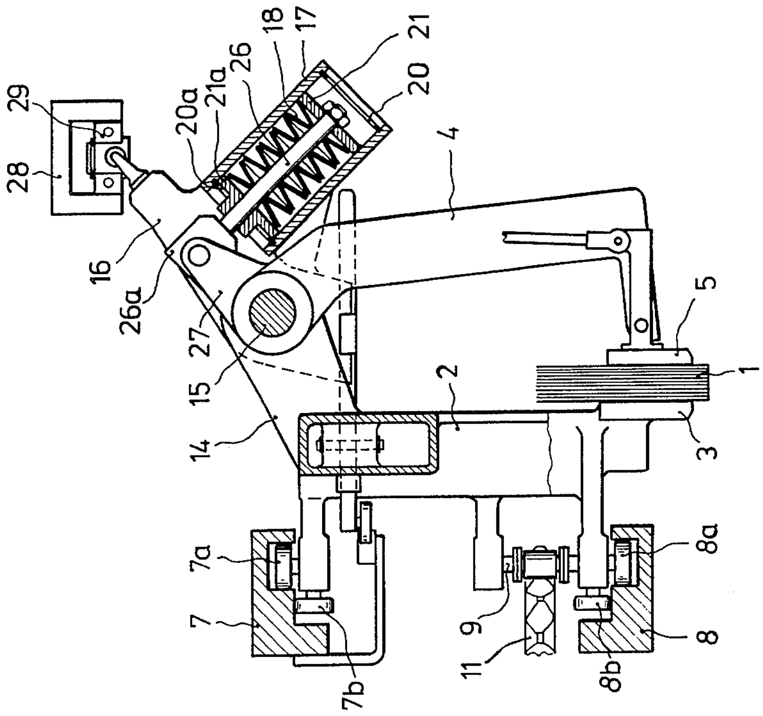
FIG. 2 is a cross-sectional side elevation view taken along line A–B of FIG. 1 showing the book block gripping jaws in the closed condition.

With reference now to the drawing, a book block gripping mechanism in accordance with the present invention will form in a transport system which is employed to move book blocks through work stations of a binding machine at which various operations are performed. The transport system will typically comprise a plurality of block gripping mechanisms which are continuously moved along a closd orbital path. The gripping mechanisms will be spaced from one another by equal intervals along this path. The individual gripping mechanisms each comprise a support frame 2. A stationary or inner jaw 3 of the block gripping mechanism is affixed to frame 2. The movable block gripping jaw 5 is supported, at the end of a pivot arm 4, from frame 2. In FIG. 2 a book block is indicated at 1 gripped between stationary jaw 3 and movable jaw 5. The transport mechanism will comprise part of a system having a frame, not shown, which supports upper and lower guide rails which are respectively indicated at 7 and 8. The guide rails 7 and 8 define the above-mentioned closed orbital path. Pairs of guide rollers, indicated at **7*a* and 7*b* and at 8*a* and 8*b*, are mounted on arms which extend from frame 2 and respectively engage tracks provided therefor in the guide rails 7 and 8. The support frame 2 is coupled, by means of an axle bolt 9, to continuous roller chain 12 which is driven, in the known manner, by a sprocket wheel 11 which forms part of the transport system. Accordingly, movement of chain 12 is transmitted to frame 2 and the book block gripping mechanism will travel with chain 12 along the path defined by the guide rails 7 and 8**.

Figure 4:
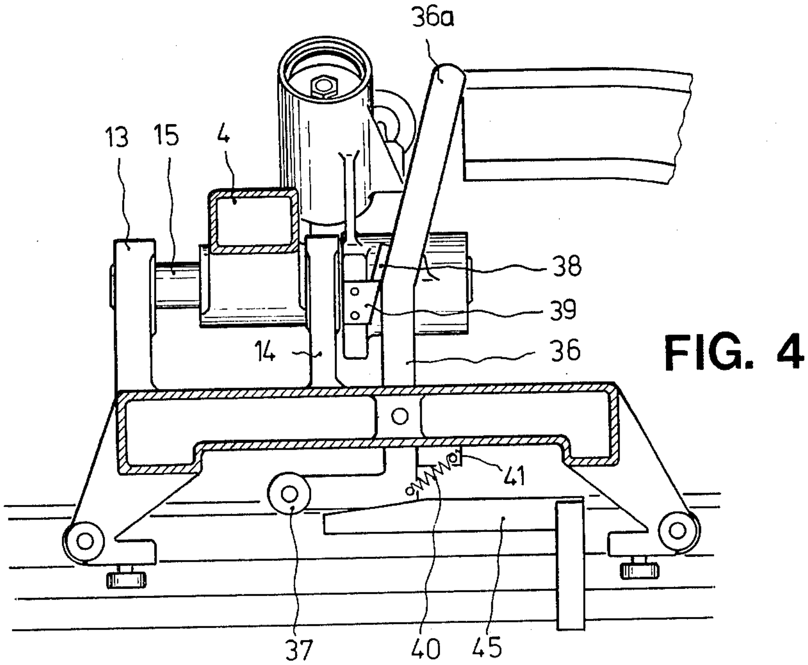
FIG. 4 is a plan view, partly in section, taken along line C–D of FIG. 1.

The pivot arm 4 is affixed to and rotates with a shaft 15. Shaft 15 is rotatably supported from frame 2 by means of support arms 13 (FIGS. 1 and 4) and 14 (FIGS. 2 and 4). A clamping force transmission lever 16 is also mounted on shaft 15 so as to be rotatable about the axis of shaft 15.

Figure 1:
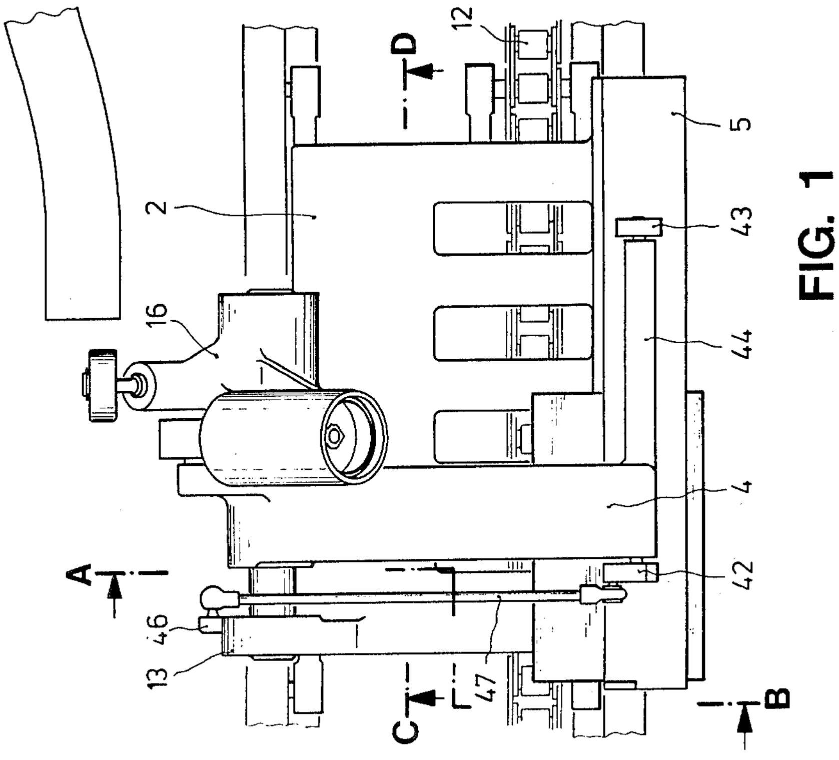
FIG. 1 is a front view of a book block gripping mechanism in accordance with a preferred embodiment of the present invention.
Figure 3:
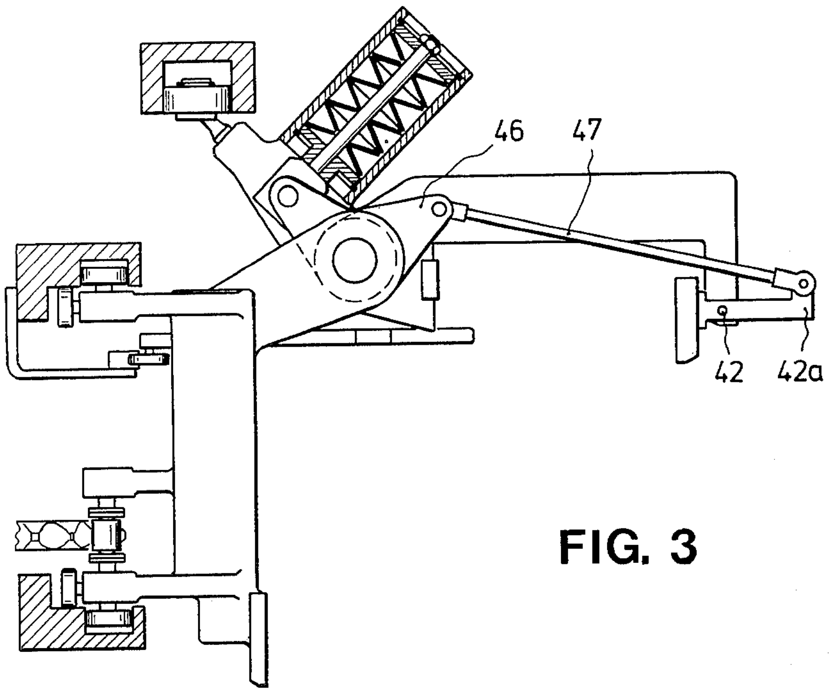
FIG. 3 is a view similar to FIG. 2 depicting the jaws in the open position.

A tubular receptacle 17 is affixed to force transmission lever 16 in the manner which may best be seen from joint consideration of FIGS. 1 and 4. A stack 18 of cup-type springs is mounted in the receptacle 17 as shown in FIGS. 2 and 3. The stack of cup-springs is positioned between a pair of pressure plates 21, **21*a***. Accordingly, the spring stack is compressible from both ends thereof.

The force transmission lever 16 is coupled to pivot arm 4 by a tension rod 26 which extends through the stack of cup springs 18. Thus, at a first end, the tension rod 26 is articulated to an extension 27 of pivot arm 4 by means of collar **26*a*. The other end of tension rod 26 is directly coupled to one end of the stack of cup springs via the pressure plate 21**.

The time of opening and closing of the movable jaw 5, i.e., the pivoting motion of support arm 4, is determined by means of a two dimensional face cam 28. A cam follower roller 29, which engages cam 28, is mounted on the end of the force transmission lever 16. The mounting of the cam follower 29 on lever 16 is by means of bearings which permits the connection point to pivot in all directions.

A gripping mechanism in accordance with the present invention is preferrably provided with a jaw-latching system which eliminates the need for the cam 29 to extend over the entire orbital track of the block gripping mechanisms, i.e., the cam 28 may be discontinuous.

The locking mechanism of the disclosed embodiment comprises a bell-crank 36 which is pivotally mounted on frame 2. A first end of bell-crank 36 supports a roller 37 while the second end of the bell-crank, indicated at **36*a*, is angularly related with respect to the main body portion of the crank and functions as a handle. The operation of the handle 36*a* will cause the opening of the movable jaw to thereby permit removal of a book block from the transport mechanism for inspection. A latch member 38 is affixed to the bell-crank 36 in a position where it cooperates with a counter-piece 39 affixed to the force transmission lever 16. A tension spring 40 extends between a stop 41 on frame 2 and bell-crank 36. The bell-crank is depicted in FIG. 4 in the locked position where the latching member 38 is captured by the counter-piece 39**.

The movable jaw 5 is pivotally attached to the end of arm 4, as can best be seen from FIG. 3, by means of connections 42 and 43 which are disposed at opposite side of the pivot arm 4. The connection 43 is located at the end of a lateral extension 44 of pivot arm 4.

In order to clamp a book block 1 in the proper manner, the movable jaw 5 must be parallel to the stationary jaw and, in the typical case, be oriented vertically. The required orientation of movable jaw 5 is accomplished by means of a lever **42*a* which comprises an extension of the pivot mounting 42 of jaw 5 from arm 4. The end of lever 42*a* disposed away from the movable jaw is connected, by means of a drop arm 47, to an extension arm 46 of frame 2. This connection may best seen from joint consideration of FIGS. 1 and 3. The connections at the opposite ends of the drop arm 47** are of the pivot type.

In operation, the book block gripping mechanism circulates continuously with the chain 12 and is caused to move to the open position of FIG. 3 by cooperation between cam 28 and cam follower 29. As cam follower 29 enters the fed-in zone of a book-binding machine, in response to a change in the contour of cam 28, motion will be imparted to the force transmission lever 16. This motion will be transferred to pivot arm 4 and will cause jaw 5 to move into the closed position of FIG. 2. As the movable jaw 5 moves toward the stationary jaw 3 it will acquire, and subsequently transmit a gripping force to, a book block 1. The gripping force will, as described above, be transmitted from the cam 28 to jaw 5 via lever 16, the stack 18 of cup springs, the tension rod 26 and the extension arm 27 of pivot arm 4. It is to be noted that the travel of lever 16 between the open and closed positions of jaw 5 will always be the same regardless of the thickness of the book block 1. Accordingly, the greater the thickness of the block, the more the stack of cup springs will be compressed and it becomes unnecessary to make adjustments to compensate for different book block thicknesses. Restated, in the operation of the present invention thin book blocks will be clamped with the preselected total maximum clamping force due to the fact that the cup springs have a degressive type characteristic curve. Since it is possible to vary this characteristic curve within wide limits, it is possible to apply high spring forces without requiring large, cumbersome springs.

After a book block has been received and clamped between jaws 3 and 5, the latching mechanism will operate and the cam follower 29 may leave the cam 28. The latching mechanism will maintain the clamped condition until such time as the cam follower 29 reenters a cam 28 and an opening force is applied to lever 16. The unlocking of the latching mechanism results from the roller 37 at the end of bell-crank 36 running onto a control rail 45.

During the opening process the force transmission lever 16, under the control of the cam 28, initially moves to the position in which the stack 18 of cup springs is extended, i.e., until pressure plate 21 reaches its limit of motion as defined by a stop 20 in tubular receptacle 17. Pivot arm 4 is then accelerated by the preload force of the stack of springs, the springs absorbing the acceleration shock by compressing in the opposite direction by virtue of the fact that the collar **26*a* at the end of tension rod 26 acts against pressure plate 21*a*. Thus, the stack of cup springs performs the dual function of transmitting a clamping force from the cam 28 to pivot arm 4** during the clamping operation and damping acceleration shocks which occur during the opening operation.

While a preferred embodiment has been shown and described, various modifications and substitutions may be made thereto without departing from the spirit and scope of the invention. Accordingly, it is to be understood that the present invention has been described by way of illustrations and not limitation.

What is claimed is:

1. In a gripper mechanism for a book block transport system, the gripper mechanism being continuously moved along a closed path and possessing a movable frame to which a stationary inner clamping jaw is affixed, the inner clamping jaw having a work contacting surface which defines a plane, the gripper mechanism further including a pivot arm which supports an outer clamping jaw, the outer clamping jaw also having a work contacting surface which defines a plane, the pivot arm being mounted on a shaft of the movable frame, the shaft having an axis and being oriented parallel to the plane defined by the work contacting surface of the inner clamping jaw, the work contacting surface of the outer jaw assuming a position substantially parallel to the work contacting surface of the inner clamping jaw when gripping a book block, the pivotal movement of the outer clamping jaw supporting pivot arm and the resultant application of the clamping force to this jaw being effected by cam means via a force transmission lever, the improvement comprising spring means for transmitting a clamping force to the outer clamping jaw via the pivot arm, said spring means being connected in series with and functionally located between the force transmission lever and the pivot arm of the outer clamping jaw, said spring means comprising a pre-loaded stack of cup springs and means for supporting said spring stack on the force transmission lever, said spring stack possessing a degressive characteristic curve, said spring means further comprising means for coupling the opposite ends of said stack of cup springs respectively to the force transmission lever and the pivot arm whereby the motion imparted to the lever by the cam means will be coupled to the pivot arm via the stack of cup springs and said stack of cup springs will function to generate a pre-selected clamping force which remains constant with variations in book block thickness and to damp acceleration shocks, said coupling means including a tension rod and means pivotally coupling a first end of said tension rod to the outer jaw supporting pivot arm, the second end of said tension rod being connected to a first end of the stack of cup springs.

2. The apparatus of claim 1 wherein the means for supporting said stack of cupped springs comprises a tubular receptacle affixed to the force transmission lever and said stack of cup springs is pre-loaded between limiting devices located at the ends of the receptacle, the spring stack being stressed against the action of the spring force from both ends, the tension rod extending through the stack of cup springs.

* * * * *